US012720277B2

(12) United States Patent
Tran et al.

(10) Patent No.: US 12,720,277 B2
(45) Date of Patent: Aug. 25, 2026

(54) INDOOR DETECTION BY SMARTPHONE WITHOUT USING GPS INFORMATION TO CONSERVE POWER

(71) Applicant: T-MOBILE INNOVATIONS LLC, Overland Park, KS (US)

(72) Inventors: Antoine Tran, Bellevue, WA (US); Po-Han Wu, Renton, WA (US); Doug Francis Kiely, Cupertino, CA (US); Jie Hui, Bellevue, WA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 301 days.

(21) Appl. No.: 18/237,302

(22) Filed: Aug. 23, 2023

(65) Prior Publication Data

US 2025/0071515 A1 Feb. 27, 2025

(51) Int. Cl.
*H04W 4/029* (2018.01)
*H04W 4/33* (2018.01)
*H04W 4/38* (2018.01)

(52) U.S. Cl.
CPC ............. *H04W 4/029* (2018.02); *H04W 4/33* (2018.02); *H04W 4/38* (2018.02)

(58) Field of Classification Search
CPC ....... H04W 64/00; H04W 4/38; H04W 4/029; H04W 4/33
See application file for complete search history.

(56) References Cited

U.S. PATENT DOCUMENTS 7,561,101 B1* 7/2009 Tester .................... G01S 19/246 342/357.77
8,592,744 B2 11/2013 Van et al.
2007/0239813 A1* 10/2007 Pinder ..................... G01S 19/48 382/248
2009/0058720 A1* 3/2009 Shaw .................... H04W 4/029 342/450
2011/0267492 A1* 11/2011 Prentice ................... G03B 7/08 348/222.1
2015/0039262 A1 2/2015 Tan et al.
2015/0097731 A1* 4/2015 Russell ................... G01S 5/012 342/450
2016/0080911 A1* 3/2016 Kay ........................ G01S 5/015 455/456.1

(Continued)

FOREIGN PATENT DOCUMENTS

CN 101779109 A * 7/2010 ............ G01J 1/4204
CN 105549717 A * 5/2016 ............ G06F 9/442
EP 2957923 A1 12/2015

OTHER PUBLICATIONS

Extended European Search Report received for European Application No. 24193862.0, mailed on Feb. 5, 2025, 9 pages.

(Continued)

*Primary Examiner* — Dung Hong
(74) *Attorney, Agent, or Firm* — SHOOK, HARDY & BACON L.L.P.

(57) ABSTRACT

Systems and methods are provided for determining that the device is not reporting precise location information, based on output from one or more sensors determining that the device is located indoors and determining the altitude of the device. Based on the determination that the device is located indoors, suspending precise location services until it is determined that the device is back outdoors.

17 Claims, 6 Drawing Sheets

(56) References Cited

U.S. PATENT DOCUMENTS

| | | | | |
|---|---|---|---|---|
| 2017/0116962 | A1 | 4/2017 | Goodman | |
| 2018/0372537 | A1 | 12/2018 | Jones | |
| 2022/0361115 | A1* | 11/2022 | Sayenko | H04W 52/146 |
| 2023/0400826 | A1* | 12/2023 | Lukaszewski | G05B 19/042 |
| 2025/0060447 | A1 | 2/2025 | Tran et al. | |

OTHER PUBLICATIONS

Non-Final Office Action received for U.S. Appl. No. 18/235,282, mailed on Aug. 26, 2025, 11 pages.

* cited by examiner

INDOOR DETECTION BY SMARTPHONE WITHOUT USING GPS INFORMATION TO CONSERVE POWER

SUMMARY

The present disclosure is directed, in part, to detecting whether a smartphone is located indoors to determine if precise location services should be temporarily suspended to conserve battery life, as shown in and/or described in connection with at least one of the figures, and as set forth more completely in the claims.

Currently, user equipment (UE) utilize a global positioning system (GPS) to determine its location by performing a calculation based on the intersection point of overlapping spheres determined by the satellites and the UE's GPS receiver. In other words, trilateration uses the distance between the satellites and the receiver to create overlapping "spheres" that intersect in a circle. The intersection is the UE's location on the ground. Unfortunately, GPS satellites do not transmit strong enough signals to reach UE's that are located indoors (e.g., through the roofs and walls of buildings). GPS signals that enter buildings through windows are unreliable since they often have bounced; and thus could give the wrong location by hundreds of meters. The present disclosure is directed to deploying towers and small cells to increase coverage targeting a building with high indoor density.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
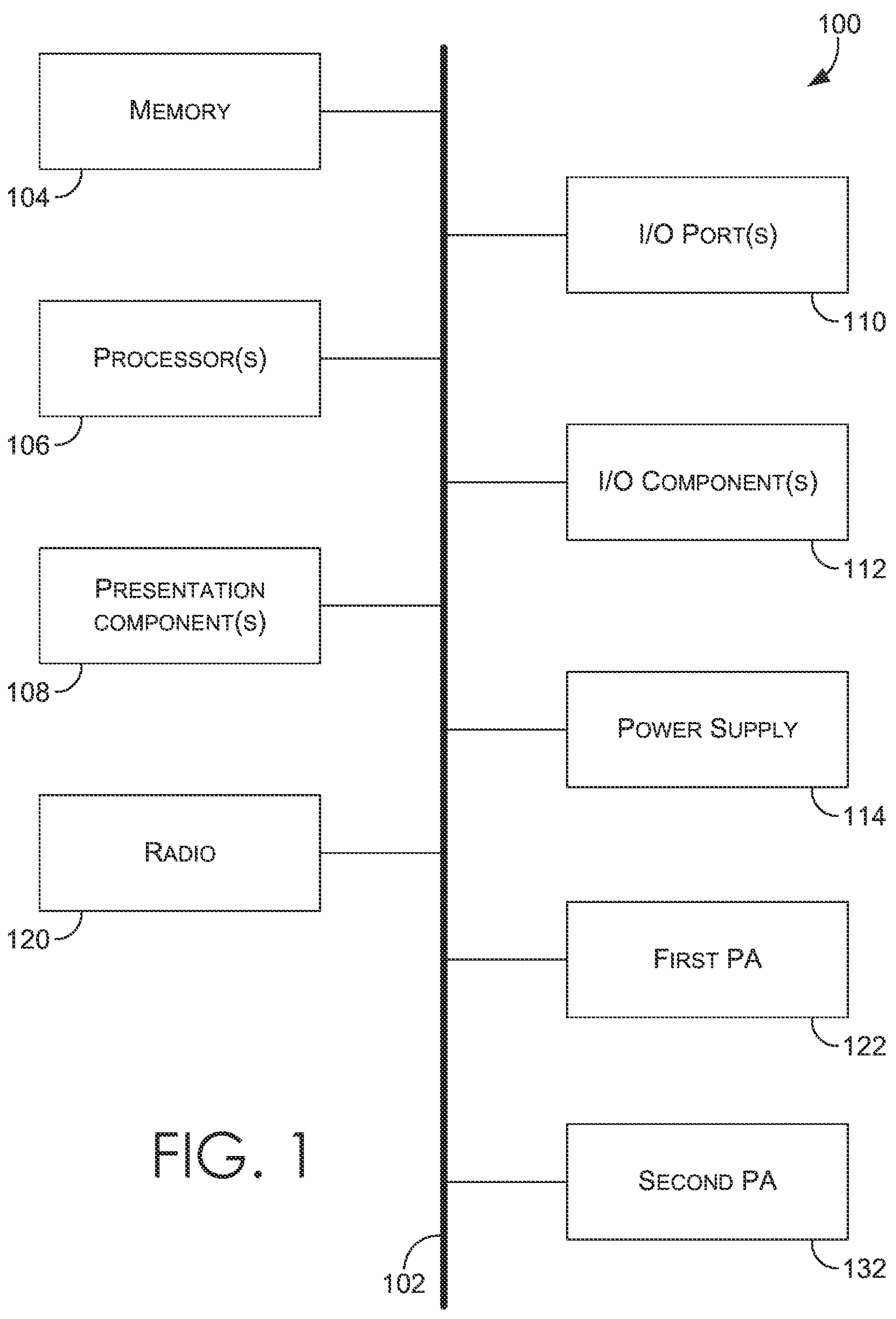
FIG. 1 depicts a diagram of an exemplary computing environment suitable for use in implementations of the present disclosure.

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

By way of background, modern mobile network operators seek to provide a high level of persistent coverage for their subscribers. One of the difficulties with providing wireless telecommunications coverage occurs when subscribers enter into buildings. In some cases, due to some building materials, elevators, and/or distance off the ground floor, it is possible that telecommunications networks may not ideally serve those subscribers. Conventionally, mobile network operators have built out systems in more or less a uniform fashion based on population density. Unfortunately, the system does not account for the difficulties of receiving a signal, such as a GPS signal, while a UE is inside of a building or other structure. Concrete, steel, and most other building materials may block signals, so even if there is a cell site nearby to serve the area it might not be close enough to ensure that the signal penetrates through the building. Unlike conventional solutions, aspects herein utilize sensors and an algorithm to determine if a population of devices is located indoors or outdoors, and builds location density models based off of that information, which otherwise might not be available, to map out indoor versus outdoor demand. As a result, the mobile network operator can deploy cell sites more proximate to highly dense indoor areas or within certain buildings to provide coverage for determined high volume indoor service areas.

Another difficulty with providing wireless telecommunications coverage occurs when subscribers ascend in a tall building. To help amplify cellular connection inside, buildings use multiple tools including cell phone signal boosters, such as a distributed antenna system (DAS), small cells (femtocells or picocells), and Wi-Fi routers. A DAS is a system of antennas and remote nodes that improves cellular coverage inside the building. However, if the DAS is on the ground floor of a building and the subscribers are on the tenth floor of the building, the signal has to travel through nine floors of concrete to provide service to the tenth floor—which would not provide very reliable coverage. The current solution is to place small cells, femtocells, and Pico cells inside a building next to a window, where they can pick up signals from the outside and disburse them throughout the building. Regardless, it is important to know where the subscriber is located in the building height-wise.

Conventionally, cell towers are height-agnostic and they are transmitting signals based on where the subscriber is positioned horizontally, not vertically. Base stations do have the ability to use linear vertical polarized arrays or crossover polarized arrays with multiple closely spaced columns per polarization. This enables beamforming or beam steering in a specific direction. For example, if there is a high volume of subscribers located on a top floor of a particular building, the base station nearby can steer the signal vertically to serve the UEs on the top floor of that building. However, historically, there has not been a way to determine on which floor the high volume of subscribers is located in order to beam form specifically to that floor. Furthermore, there has not been a way to accurately locate the floor on which a UE is located in the case of an emergency.

In one exemplary aspect, when a subscriber calls 911, altitude information is not sent to help the emergency responders find the person quickly. Traditionally, determining the altitude of a UE is done using GPS. However, the UE needs at least four satellites, with one directly overhead to get a good altitude reading. That being said, the altitude reading will not be accurate if the subscriber is indoors because the building material blocks the signal. In order to solve those problems, and unlike conventional solutions, aspects are directed to a system that utilizes one or more sensors in a UE to estimate the altitude or height of a UE within a structure, such that the altitude can be communicated to emergency services, or so that it can be used by mobile network operators to improve the provision of wireless service.

Precise location services provided to a UE may require use of precise location information, such as GPS. GPS is a network of satellites and receiving devices used to determine the location of something on Earth, such as a UE. Some GPS receivers are so accurate they can establish location within one centimeter because they provide location in latitude, longitude, and altitude. However, GPS is notorious for its inability to provide users and their devices with geolocating capabilities when the UEs are inside a building. That is, the signal that is being transmitted from GPS satellites is so weak that it becomes unusable or unstable when a UE is located within a building. Modern UEs in many cases are configured to search for GPS signals if they have location services activated. In the absence of GPS signals, perhaps because a UE is located indoors, the UE will inefficiently search for a signal that may not be present, thereby depleting the battery of the UE faster than it normally would. In many UEs with a limited power supply, such as a cell phone, this can exasperate unwanted power.

Aspects provided herein utilize GPS to determine whether a UE is indoors or outdoors. However, just because a UE does not have GPS signal is not proof in and of itself that the UE is located indoors. There may be many times when a phone may have an interruption to GPS signaling, but this interruption may be very brief (e.g., driving through a tunnel). Because of this, the UE may not deactivate the GPS service. Generally, it is not an effective solution to deactivate GPS as soon as the UE has an interruption to the signal, given that the interruption may be brief.

Unlike conventional solutions, aspects herein are directed to determining, without GPS, whether a UE is located indoors. Based on a determination that the UE is indoors for a predetermined amount of time, the UE will stop searching for GPS signals for a predetermined amount of time, thus conserving power. The network may instruct the UE to deactivate the precise location information for a period of time until it has been determined that the user device is no longer indoors. For example, at some other subsequent period of time, the UE will use its sensors again to determine that the device is outdoors and turn the location services back on. The sensors could check every 1 minute, 5 minutes, 10 minutes, 15 minutes, 30 minutes, or the like. These specific times are provided for exemplary purposes only, and not for limitation.

As used herein, the term "cell site," may include an "access point," "node," or "base station refer to a centralized component or system of components that is configured to wirelessly communicate (receive and/or transmit signals) with a plurality of stations (i.e., wireless communication devices, also referred to herein as user equipment (UE(s))) in a geographic service area. A cell site suitable for use with the present disclosure may be terrestrial (e.g., a fixed/non-mobile form such as a macro cell site or a utility-mounted small cell) or may be extra-terrestrial (e.g., an airborne or satellite form such as an airship or a satellite).

The terms "user device," "user equipment," "UE," "mobile device," "mobile handset," and "mobile transmitting element" all describe a mobile station and may be used interchangeably in this description. The terms "GPS," "global positioning system," and "precise location information" may be used interchangeably to describe methods to determine or calculate exact location. Certain terminology may be used to differentiate access points and/or antenna arrays from one another; for example, a combination access point may be used to describe an access point having a primary antenna array and a redundant antenna array that have different orientations (i.e., configured to serve different geographic areas), distinguished from a traditional access point which may be used to describe an access point comprising a single antenna array used to communicate to a single geographic area.

Accordingly, a first aspect of the present disclosure is directed to a method for determining a location of a device, the method comprising determining that the device is not reporting precise location information, based on output from one or more sensors determining that the device is located indoors and instructing the device to suspend precise location services on the device.

A second aspect of the present disclosure is directed to a system for determining a location of a device. The system comprises one or more processors and one or more non-transitory computer storage hardware devices storing computer-usable instructions that, when used by the one of more processors, cause the one or more processors to determine the device is located indoors based on data from one or more sensors associated with the device. Based on the device being located indoors, precise location services on the device are suspended for a pre-determined period of time.

According to another aspect of the technology described herein, one or more computer-readable media are provided having computer-executable instructions embodied thereon that, when executed, cause the one or more processors to perform a method. The method includes determining that the device is located indoors based on data from one or more sensors associated with the device. Further, the method includes based on the device being located indoors, suspending precise location services on the device for a pre-determined period of time.

According to another aspect of the technology described herein, a method is provided for determining that a device is located indoors. The method comprises determining that the device is not reporting precise location information to a wireless communications network, receiving sensor data from one or more sensors associated with the device, and determining, using the sensor data, that the device is located indoors.

Another aspect of the present disclosure is directed to a system for determining a location of a device, the system comprising one or more processors and one or more non-transitory computer storage hardware devices storing computer-usable instructions that, when used by the one of more processors, cause the one or more processors to perform a method. The method includes determining that the device is not reporting precise location information to a wireless communications network, receiving sensor data from one or more sensors associated with the device, and determining, using the sensor data, that the device is located inside a structure.

According to another aspect of the technology described herein, one or more computer-readable media having computer-executable instructions embodied thereon are provided. When executed, the computer-executable instructions cause the one or more processors to determine that the device is not receiving precise location information from a wireless communications network, send sensor data from the one or more sensors associated with the device to the wireless communications network, and determine, using the sensor data, that the device is located indoors.

Accordingly, another aspect of the present disclosure is directed to a method for determining an altitude of a device, the method comprising determining that the device is not reporting precise location information, receiving sensor data from one or more sensors associated with the device, and determining, using the sensor data, the altitude of the device.

Yet another aspect of the present disclosure is directed to one or more computer-readable media is provided having computer-executable instructions embodied thereon that, when executed, cause the one or more processors to determine that the device is not reporting precise location information to a wireless communications network, send sensor data from one or more sensors associated with the device to the wireless communications network, and determine, using the sensor data, the altitude of the device.

According to a final aspect of the technology described herein, a system is provided for determining a location of a device. The system comprises one or more processors and one or more non-transitory computer storage hardware devices storing computer-usable instructions that, when used by the one of more processors, cause the one or more processors to determine that the device is located indoors based on data from one or more sensors, and based on data from the one or more sensors associated with the device, determine an altitude of the device.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VOIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
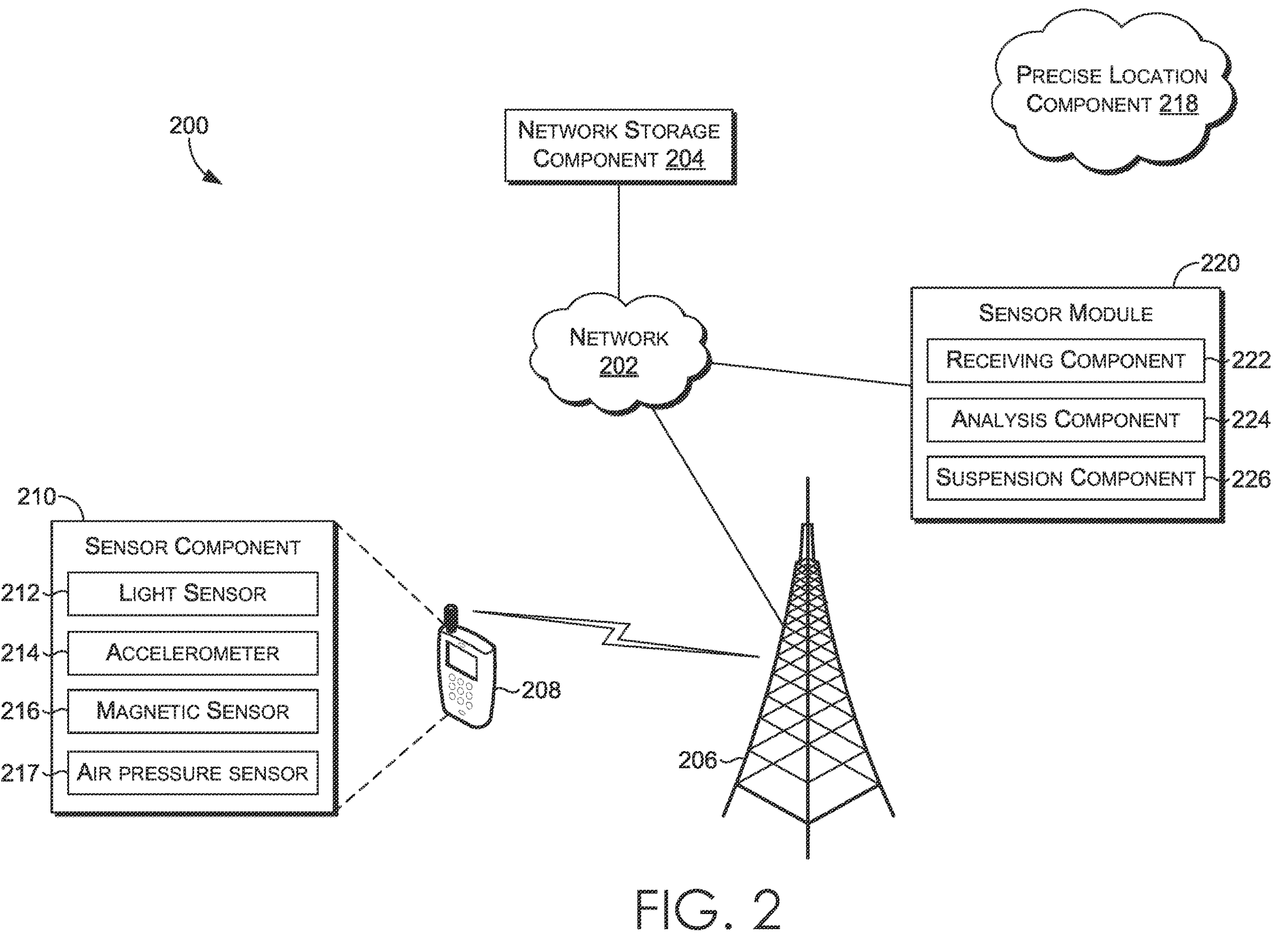
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 generally includes a cell site 206, one or more user devices 208, and one or more components configured to wirelessly communicate between the one or more user devices 208 and a network 202. Though illustrated as a macro site, the cell site 206 may be a macro cell, small cell, femto cell, pico cell, or any other suitably sized cell, as desired by a network carrier for communicating within a particular geographic area. In aspects, such as the one illustrated in FIG. 2, the cell site 206 may comprise one or more nodes (e.g., NodeB, eNodeB, ng-eNodeB, gNodeB, en-gNodeB, and the like) that are configured to communicate with user devices in one or more discrete geographic areas using one or more antennas of an antenna array. In the aspect illustrated in FIG. 2, the cell site 206 provides a coverage to user device 208. The network environment 200 may also include one or more computer processing components that form a sensor module 220.

The network environment 200 may also include network storage component 204 and precise location component 218. Network storage component 204 may be used to store information associated with user device 208, such as data collected from the sensor components 210. Conventionally, the user device 208 can utilize different sources of information to provide location information. One way the user device 208 can determine its precise location is via signals from the precise location component 218. In aspects, precise location component 218 may take the form of a satellite positioning system such as the global positioning system (GPS), GLONASS, and Galileo. Signals from a plurality of satellites received by the user device 208 are used to triangulate the precise location of the user device 208. In addition to determining its position on the ground (i.e., a two-dimensional position), the user device 208 may use the precise location component 218 to determine a three-dimensional position, including its height above ground. In the absence of a connection of a user device 208 and precise location component 218, the user device 208 may not be able to determine one or both of its horizontal and vertical location.

In some aspects, the user device 208 is configured to communicate its precise location (i.e., precise location information) to the cell site 206. In aspects where the user device 208 is not reporting precise location information, such as when the precise location component 218 is unavailable to the user device 208, the user device 208 may utilize one or more sensors according to any one or more aspects described herein to determine that the device is located indoors and communicate that determination to the cell site 206. As a result, the cell site 206 may communicate an instruction from the network 202 to the user device 208 instructing the user device 208 to suspend precise location services on the device, which may cause the user device 208 to disable one or more hardware components and/or processes associated with determining a precise location based on a search for signals from the precise location component 218.

The network environment 200 includes cell site 206 that is configured to wirelessly communicate with the user device 208, which may take the form of computing device 100 of FIG. 1. For the purpose of this disclosure, as mentioned herein, a cell site is used in its general sense, being defined as a station for transmitting and/or receiving RF signals; accordingly, the cell site 206 may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable cell site is not protocol-specific, but instead may be configured to communicate using any wireless telecommunication protocol that is compatible with the user device 208, such as 3G, 4G, 5G, 6G, 802.11x, or any other wireless standard. A suitable cell site is also not exclusive to cellular telecommunication networks, it may take the form of any wireless communication system and used at any desirable frequency (e.g., microwave relays). Cell sites consistent with the present disclosure may be configured to provide coverage to certain geographic service area, and will have one or more backhaul connections that connect it to a broader telecommunications and/or information network, such as the network 202, for the provision of telecommunication and/or information service(s) to the user device 208. As illustrated, the cell site 206 may take the form of a macro cell; however, the cell site 206 may take any desirable form, such as a small cell, or a residential Wi-Fi router. As seen in the embodiment illustrated by FIG. 2, cell sites suitable for use in the present disclosure may be terrestrial, that is, they are coupled to the earth via a tower or some other structure, such as the cell site 206; alternatively, a suitable cell site may be extra-terrestrial, that is coupled to an aircraft or a satellite.

The network environment 200 comprises the network 202. The network 202 comprises any number of components that are generally configured to provide voice and/or data services to wireless communication devices, such as the user device 208, which is wirelessly connected to the cell site 206. For example, the network 202 may comprise one or more additional wireless cell sites, a core network, an IMS network, a PSTN network, or any number of servers, computer processing components, and the like. The network 202 may include access to the World Wide Web, internet, or any number of desirable data sources, which may be queried to fulfill requests from wireless communication devices that make requests via the cell site 206.

The network environment 200 comprises one or more user devices 208, with which the cell site 206 connects to the network 202. Generally, the user device 208 may have any of the one or more aspects described with respect to the computing device 100 of FIG. 1. For the purposes of the present disclosure, the user device 208 may utilize a wireless data connection to communicate with the cell site 206. The network environment 200 comprises one or more computer processing components that form the sensor module 220. The sensor module 220 may comprise one or more components, taking the form of any combination of hardware components, logical components, and computer-programmed services running on one or more computer processing components that are generally configured to identify and communicate a ranking of the particular cell site to determine if it should be decommissioned. The sensor module 220, including its one or more subcomponents, may be disposed at or near the cell site 206, within or adjacent to the network 202, locally on the user device 208, or disposed in multiple locations. As discussed in the present disclosure, the subcomponents of the sensor module 220 are divided by function; however, more or fewer components may carry out the functions of the sensor module 220, and the functionality described herein with respect to particular subcomponents of the sensor module 220 may be performed by other subcomponents of the sensor module 220 without departing from the inventive concept conceived herein. Accordingly, the sensor module 220 may be said to comprise one or more sub-components including a receiving component 222, an analysis component 224, and a suspension component 226

The receiving component 222 receives data from the sensor components 210 to determine the user device's 208 altitude and/or if it is located indoors. The sensor components 210 may be said to comprise a light sensor 212, an accelerometer 214, a magnetic sensor 216, and an air pressure sensor 217. The light sensor 212 measures the frequency of the intensity of light exposed to the user device 208 to determine if the light is natural or artificial. Natural light is full spectrum, which means it contains all of the colors of the rainbow, as well as wavelengths that we cannot see. Natural light is dynamic, which means the intensity and wavelengths change with the time of day, time of year, the weather and location on earth. Most artificial light sources simulate white light by providing only a few colors of the rainbow. The light sensor 212 measures the light frequency to the light the user device 208 is exposed to and determines, based on the time of day and time of year, if the light is natural or artificial. This may then be used to determine if the user device 208 is indoors or outdoors. If the user device 208 is near a window, the light intensity may be closer to an outdoor environment and the other sensors will need to be relied upon.

The accelerometer 214 measures the speed of the user device 208 to determine if the user device 208 is idle or moving. If the user device 208 is idle, the user device 208 may be indoors because the subscriber is at work or at an event. If the user device 208 is moving, the user device 208 may be outdoors because the subscriber may be driving in the car or walking outside. The accelerometer 214 can also tell when the user device 208 is in a vehicle because acceleration change while driving is more randomized compared to a good periodicity in walking acceleration. The magnetic sensor 216 measures the user device's 208 orientation in comparison to the direction of the sun. For example, if the user device 208 detects light coming from the east, but it is evening, the magnetic sensor 216 know that natural light would be coming from the west at that time of night, so the user device 208 is detecting artificial light and must be located indoors.

To detect change in altitude, the user device 208 uses an air pressure sensor 217. The air pressure sensor 217 takes an initial reading once the user device 208 is indoors and calibrates the air pressure sensor 217 to consider the initial reading to be on the ground floor. The air pressure sensor 217 takes continuous readings going forward to determine the change in air pressure and the altitude of the user device 208. By using pressure readings from the user device 208 and extracting temporal changes of pressure to calculate the upward or downward changes of height, the sensor components 210 can translate the change to the number of floor changes.

Once the receiving component 222 has received the data from the sensor components 210 on the user device 208, the analysis component 224 can determine if the device is indoors and the user device's 208 altitude. If the user device 208 is located indoors, the suspension component 226 turns off precise location services to preserve battery life of the user device 208. After a pre-determined amount of time, the sensor components 210 uses the sensors to determine if the user device 208 is still located indoors. Once the sensor components 210 sends the sensor module 220 data that the user device 208 is located outdoors, the suspension component 226 can turn the precise location services for the user device 208 back on.

Figure 3:
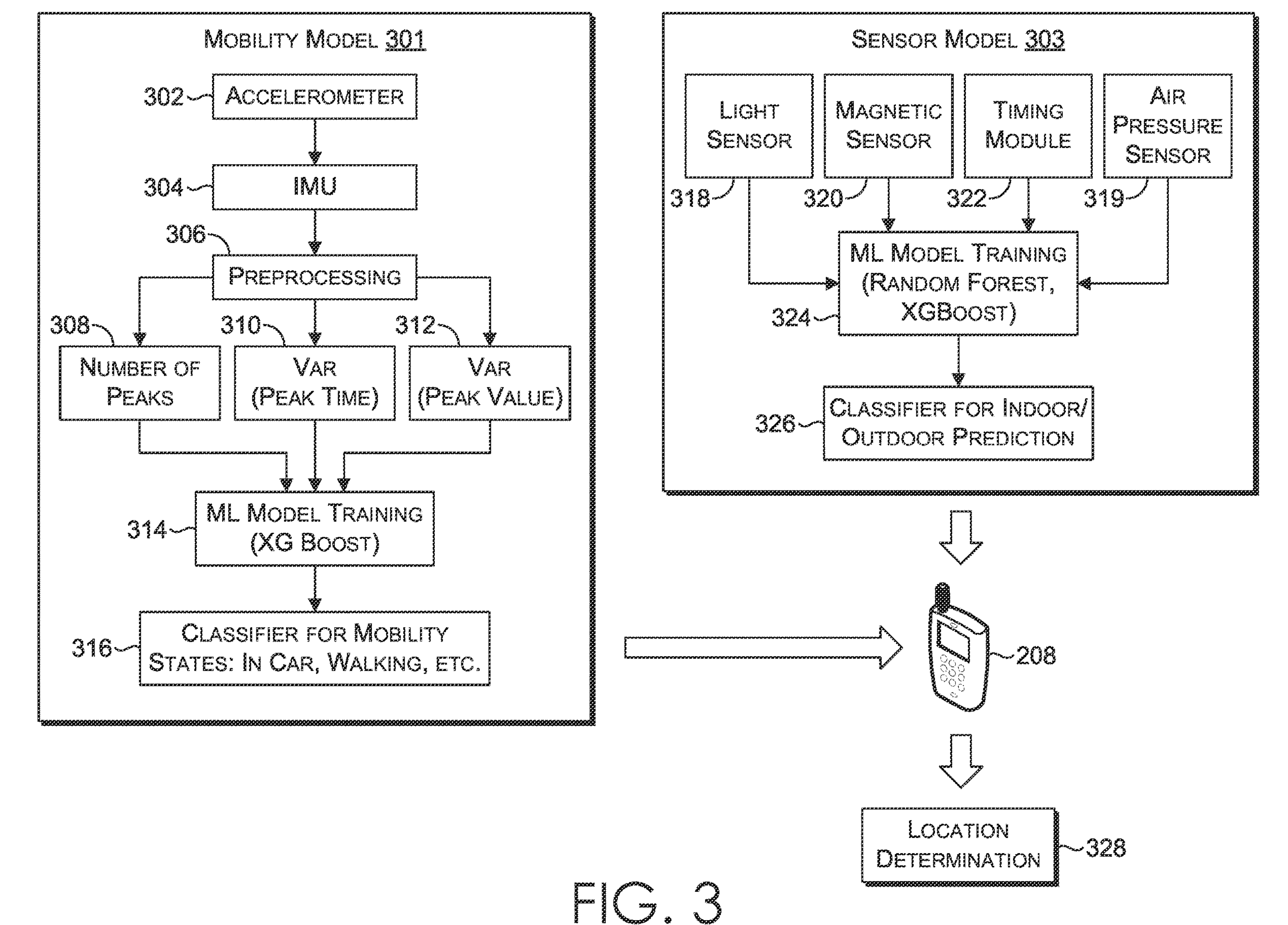
FIG. 3 depicts a schematic diagram illustrating how a network makes particular machine learning predictions, according to some embodiments.

Turning now to FIG. 3, a schematic diagram 300 illustrates how a machine-learned model is trained and how it makes predictions. In one or more embodiments, the machine-learned model represents or includes at least some of the functionality as described with respect to the network environment 200 of FIG. 2. In some embodiments, the machine-learned model represents or includes alternative or additional model functionality, such as supervised learning (e.g., using logistic regression, using back propagation neural networks, using random forests 324, XGBoost 314/324, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest 324, multivariate adaptive regression splines, gradient boosting machines such as XGBoost 314/324, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method 324, XGBoost 314/324, etc.), and/or any suitable form of machine learning algorithm.

In some embodiments, the machine-learned model has multiple input nodes and one or more output nodes, where each node represents an input variable or feature (e.g., examples, data in the target content, etc.) and where each node comprises a linear/non-linear function and an activation function. In aspects, the mobility model 301 comprises an input in the form of an accelerometer 302 (which may have any one or more aspects of the accelerometer 214 of FIG. 2); and the sensor model 303 comprises one or more of an light sensor 318 (e.g., the light sensor 212 of FIG. 2), a magnetic sensor 320 (e.g., the magnetic sensor 216 of FIG. 2), the air pressure sensor 319 (e.g., the air pressure sensor 217 of FIG. 3), and a timing module 322. A given node typically takes the weighted sum of its inputs, and passes it through an activation function (e.g., a dot product vector, inertial measurement units (IMU) 304, etc.). This is the output of the node, which then becomes the input of another node in the next layer. The signal flows from top to bottom, and the final output is calculated by performing this procedure for all the nodes.

In some embodiments, before the pre-training data input(s) (or the number of peaks 308, variation of peak time 310, and variation of peak value 312) are provided as input into the training model, the inputs are preprocessed at a mobility classifier preprocessor 306. In some embodiments, such pre-processing includes data wrangling, data munging, scaling, and the like. Data wrangling and data munging refers to the process of transforming and mapping data from one form (e.g., "raw") into another format with to make it more appropriate and useable for downstream processes. Scaling (or "feature scaling") is the process of changing number values (e.g., via normalization or standardization) so that a model can better process information. For example, some embodiments can bind number values between 0 and 1 via normalization. Other examples of preprocessing includes feature extraction, handling missing data, feature scaling, and feature selection.

Though illustrated as comprising a plurality of embodiments, the machine-learned model may perform extraction operations in order to reduce dependence or variability on erroneous inputs or analyses. Extraction involves computing a reduced set of values from a high-dimensional signal capable of summarizing most of the information contained in the signal. Feature extraction techniques develop a transformation of the input space onto the low-dimensional subspace that attempts to preserve the most relevant information. In feature selection, input dimensions that contain the most relevant information for solving a particular problem are selected. These methods aim to improve performance, such as estimated accuracy, visualization, and comprehensibility. An advantage of feature selection is that important information related to a single feature is not lost, but if a small set of features is required and original features are very diverse, there is chance of information being lost as some of the features must be omitted. On the other hand, with dimensionality reduction, also known as feature extraction, the size of the feature space can often be decreased without losing information about the original feature space.

In some embodiments, these feature extraction techniques include, but are not limited to Minimum Redundancy Maximum Relevance ("mRmR"), Relief, Conditional Mutual Information Maximization ("CMIM"), Correlation Coefficient, Between-Within Ratio ("BW-ratio"), Interact, Genetic Algorithms ("GA"), Support Vector Machine-Recursive Feature Elimination ("SVM-REF"), Principal Component Analysis ("PCA"), Non-Linear Principal Component Analysis, Independent Component Analysis, and Correlation based feature selection. These feature extraction techniques are useful for machine learning because they can reduce the complexity of input data and give a simple representation of data representing each variable in feature space as a linear combination of the original input variable.

In some embodiments, the pre-processing of the data at 306 includes missing data techniques. In some embodiments, these missing data techniques include complete case analysis, single imputation, log-linear models and estimation using the EM algorithm, propensity score matching, and multiple imputations. The technique confines attention to cases for which all variables are observed in a complete case analysis. In a single implicit imputation method, missing values are replaced by values from similar responding units in the sample. The similarity is determined by looking at variables observed for both respondent and non-respondent data. Multiple imputations replace each missing value with a vector of at least two imputed values from at least two draws. These draws typically come from stochastic imputation procedures. In the log linear model, cell counts of a contingency table are modeled directly. An assumption can be that, given expected values for each cell, the cell counts follow independent multivariate Poisson distributions. These are conditional on the total sample size, with the counts following a multinomial distribution.

In some embodiments, the preprocessing at 306 includes outlier detection and correction techniques for handling outlier data within the input data 302/318/320/322 of the mobility model 301 and/or the sensor model 303. Outliers, by virtue of being different from other cases, usually exert a disproportionate influence on substantive conclusions regarding relationships among variables. An outlier can be defined as a data point that deviates markedly from other data points.

For example, error outliers are data points that lie at a distance from other data points because they result from inaccuracies. More specifically, error outliers include outlying observations that are caused by not being part of the targeted population of data, lying outside the possible range of values, errors in observation, errors in recording, errors in preparing data, errors in computation, errors in coding, or errors in data manipulation. These error outliers can be handled by adjusting the data points to correct their values or more such data points from the data set. In some implementations, particular embodiments define values more than three scaled median absolute deviations ("MAD") away from the median as outliers. Once defined as an outlier, some embodiments replace the values with threshold values used in outlier detection.

In some embodiments, the preprocessing at 306 includes feature scaling on the input(s) 302/318/320/322 as part of the data preprocessing process. Feature scaling is a method to unify self-variables or feature ranges in data. In some embodiments, feature scaling is a necessary step in the calculation of stochastic gradient descent. Particular embodiments can perform various feature scaling techniques. In some embodiments, these feature scaling techniques include, but are not limited to, data normalization methods and interval scaling.

In some embodiments, preprocessing at 306 includes data normalization. Data normalization is a basic work of data mining. Different evaluation indicators often have different dimensions, and the difference in numerical values may be very large. Without processing, the results of data analysis may be affected. Standardized processing is needed in order to eliminate the influence of dimension and range differences between indicators. The data is scaled to a specific area to facilitate comprehensive analysis. The premise of the normalization method is that the eigenvalues obey the normal distribution, and each genus is transformed into a standard positive distribution with a mean of 0 and a variance of 1 by translation and scaling data transformation. The interval method utilizes the boundary information to scale the range of features to a range of features. For example, the commonly used interval scaling methods such as [0, 1] use two extreme values (maximum and minimum values) for scaling.

In some embodiments, the preprocessing at 306 includes feature selection at the input data 302/318/320/322. Feature selection techniques can be performed for dimensionality reduction from the extracted features. The feature selection techniques can be used to reduce the computational cost of modeling, to achieve a better generalized, high-performance model that is simple and easy to understand. Feature extraction techniques can be performed to reduce the input data's dimensionality. However, in some implementations, the resulting number of features may still be higher than the number of pre-training data 308, 310, and/or 312. Therefore, further reduction in the dimensionality of the data can be performed using feature selection techniques to identify relevant features for classification and regression. Feature selection techniques can reduce the computational cost of modeling, prevent the generation of a complex and overfitted model with high generalization error, and generate a high-performance model that is simple and easy to understand. Some embodiments use the mRmR sequential feature selection algorithm to perform feature selection. The mRmR method is designed to drop redundant features, which can design a compact and efficient machine learning-based model.

After preprocessing at 306, in various embodiments, the machine-learned model is trained (e.g., via pre-training and/or prompt engineering) using one or more data sets of the preprocessed training data input(s) 308, 310, and/or 312 in order to make acceptable training prediction(s) (e.g., classifiers) at 316/326 at the appropriate weights, which will help later at prompt engineering or deployment time to make correct inference prediction(s). In one or more embodiments, learning or training includes minimizing a loss function between the target variable (for example, an incorrect prediction that a phrase has semantic meaning X in pre-training) and the actual predicted variable (for example, a correct prediction that the phrase has semantic meaning Y). Based on the loss determined by a loss function (for example, Mean Squared Error Loss (MSEL), cross-entropy loss, etc.), the loss function learns to reduce the error in prediction over multiple epochs or training sessions so that the machine-learned model learns which features and weights are indicative of the correct inferences, given the inputs. Accordingly, it is desirable to arrive as close to 100% confidence in a particular classification or inference as close as possible so as to reduce the prediction error. In an illustrative example, the machine-learned model learns over several epochs that for a given set of character sequences, the correct meaning or the text to be generated next is Y (e.g., via NSP or MLM).

Subsequent to a first round/epoch of training, the machine-learned model makes predictions with a particular weight value, which may or may not be at acceptable loss function levels. For example, the machine-learned model may process the pre-processed training data input(s) 308, 310, and/or 312 a second time to make another pass of predictions on the user device 208 side (e.g., location determination(s) 328). This process may then be repeated over multiple iterations or epochs until the weight values are set for optimal or correct predicted value(s) is learned (for example, by maximizing rewards and minimizing losses) and/or the loss function reduces the error in prediction to acceptable levels of confidence.

In one or more embodiments, the machine-learned model converts or encodes the deployment input(s) and training data input(s) 308, 310, and/or 312 into corresponding feature vectors in feature space (for example, via a convolutional layer(s)). A "feature vector" (also referred to as a "vector") as described herein may include one or more real numbers, such as a series of floating values or integers (for example, [0, 1, 0, 0]) that represent one or more other real numbers, a natural language (for example, English) word and/or other character sequence (for example, a symbol (for example, @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value or other content in pages into one or more feature vectors.

In some embodiments, such as in clustering techniques, the machine-learned model learns, via training, parameters, or weights so that similar features are closer (for example, via Euclidian or cosine distance) to each other in feature space by minimizing a loss via a loss function (for example, Triplet loss or GE2E loss). Such training occurs based on one or more of the preprocessed training data input(s) 308, 310, and/or 312, which are fed to the machine-learned model. One or more embodiments determine one or more feature vectors representing the input(s) 308, 310, and/or 312 in vector space by aggregating (for example, mean/ median or dot product) the feature vector values to arrive at a particular point in feature space.

In one or more embodiments, the machine-learned model learns features from the pre-training data input(s) 308, 310, and/or 312 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. For example, correct answers to given questions are given weights closer to 1, whereas incorrect answers are given weights of 0.

In another illustrative example of training, one or more embodiments learn an embedding of feature vectors based on learning (for example, deep learning) to detect similar features between training data input(s) 308, 310, and/or 312 in feature space using distance measures, such as cosine (or Euclidian) distance. For example, the training data input 308, 310, and/or 312 is converted from string or other form into a vector (for example, a set of real numbers) where each value or set of values represents the individual features in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. In this way, embodiments learn weights corresponding to different features such that similar features found in inputs contribute positively for predictions.

In some embodiments, such training is supervised or not supervised using annotations or labels. For example, in some embodiments, training includes (or is preceded by) annotating/labeling training data 308, 310, and/or 312 so that the machine-learned model learns the features, which is used to change the weights/neural node connections for future predictions. As such, the machine-learned model accordingly adjusts the weights or deactivates nodes such that certain words are likely to follow other words (e.g., in NSP or MLM). For example, each prompt may be labeled with the correct answer or each answer may be labeled with the correct prompt.

In some embodiments, after the machine-learned model has initially adjusted its weights during training to arrive at optimal loss function levels, particular embodiments, such as the sensor components 210 and/or the sensor module 220 detect whether the user device 208 is indoors or outdoors, as well as its elevation, as described herein. In these embodiments, the initialization weight value is the final training value before optima loss function levels are achieved. However, if the likelihood of the user device 208 to be indoors is detected to be above a threshold, particular embodiments once again adjust the weights, as illustrated in FIG. 3. In some embodiments, such weights are adjusted based on the machine-learned model iterating (e.g., making a prediction without examples or different examples) or continuously producing an output until the output has a likelihood of the user device 208 being indoors is below a threshold. In these embodiments, when this occurs, the machine-learned model learns which features or otherwise learns patterns in the new outputs (e.g., a new text summary) and/or new inputs (e.g., examples were not used or other examples were used). In this way, specific inputs and outputs are learned or mapped together in prompt engineering, for example.

In one or more embodiments, subsequent to the machine-learned model training, the machine-learned model (for example, in a deployed state) receives one or more of the pre-process deployment input(s) 302/318/320/322. When a machine learning model is deployed, it has typically been trained, tested, and packaged so that it can process data it has never processed. Responsively, in one or more embodiments, the deployment input(s) 302/318/320/322 are automatically converted to one or more feature vectors and mapped in the same feature space as vector(s) representing the training data input(s) 308, 310, and/or 312 and/or training predictions(s) at the location determination 328 step. Responsively, one or more embodiments determine a distance (for example, a Euclidian distance) between the one or more feature vectors and other vectors representing the training data input(s) 308, 310, and/or 312 or predictions, which is used to generate one or more of the prediction(s). In some embodiments, the preprocessed input(s) 302/318/320/322 are fed to the layers of neurons of the machine-learned model, where the weights dictate the output.

One or more of a mobility classification 316 output from the mobility model 301 and a sensor classification 326 output from the sensor model 303 may be used by the user device 208 of FIG. 2 to make one or more location determinations 328. According to any one or more aspects discussed with respect to FIG. 2, the one or more location determinations 328 may comprise an altitude determination or an indoor/outdoor determination. In aspects, the location determination 328 is a factor to be used to find cell site candidate locations. In some aspects, the location determination 328 is used to provide information to an output of a graphical user interface (GUI). In some aspects, the location determination 328 is used to provide information to 911 or public safety answer point (PSAP). In a first aspect, wherein the user device 208 may utilize a first classification output to confirm the output from a second classification; for example, the sensor classification output from the sensor model 303 may suggest that the user device 208 is located indoors but when compared to the mobility classification 316 output from the mobility model 301, the user device 208 may more accurately determine that the user device 208 is located inside a car and should not be considered "indoors" for the purposes of the one or more determinations 328. In other aspects, the user device 208 may be configured to utilize the classifications from both machine-learned models in order to make the one or more determinations 328; for example, altitude determinations may be the result of sensor classification output from the sensor model 303 (e.g., chiefly relying on information from the air pressure sensor 319) and mobility classification 316 output from the mobility model 301.

Figures 4A, 4B:
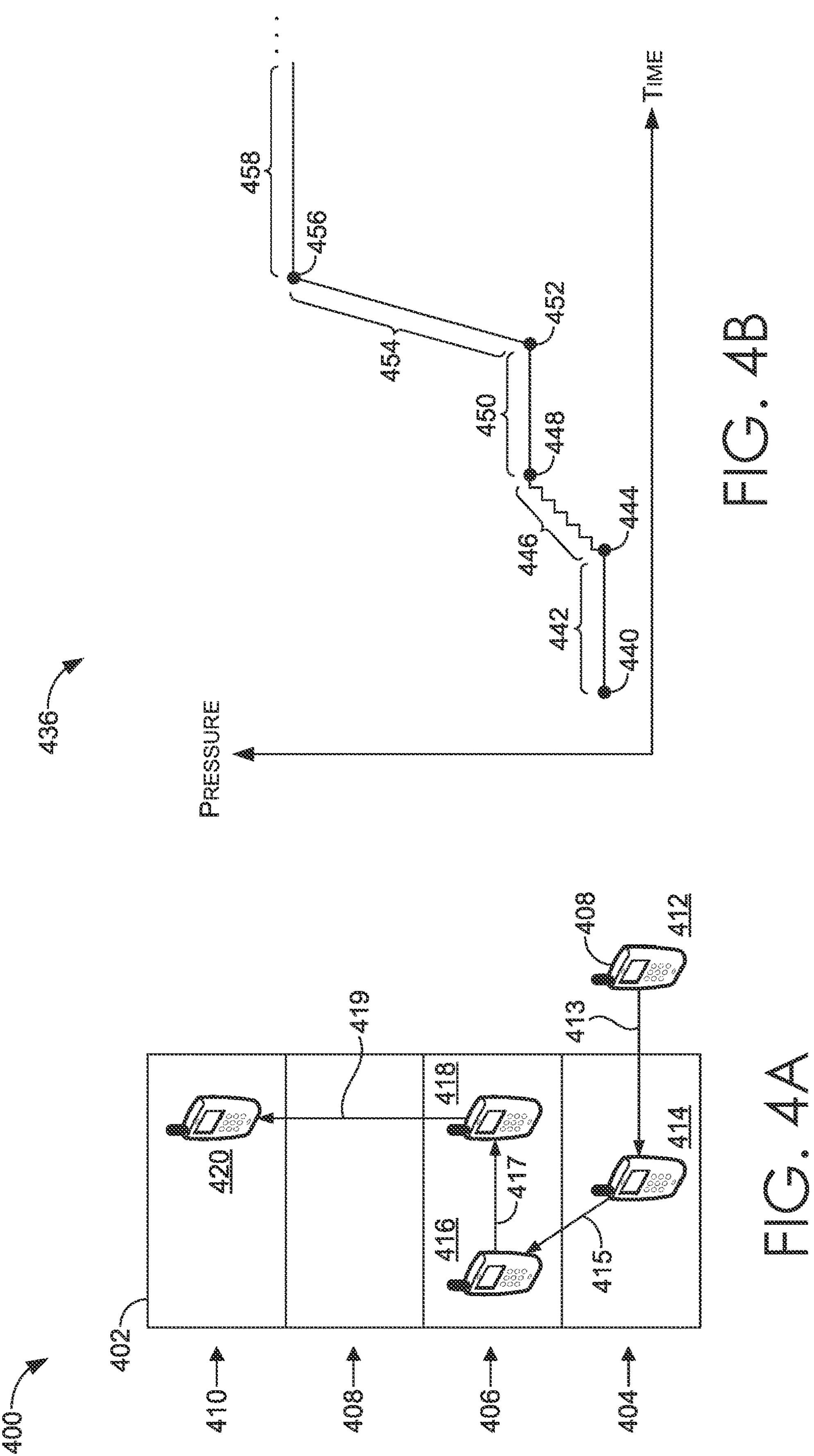
FIGS. 4A-4B depicts an exemplary environment in which implementations of the present disclosure may be employed.

Turning to FIGS. 4A-4B, an exemplary environment 400 is illustrated in which implementations of the present disclosure may be employed. The environment 400 may include user device 208 and a building 402. The building 402 has multiple floors, such as the first floor 404, second floor 406, third floor 408, and fourth floor 410. Initially, the user device 208 may be at a first location 412 (outside of the building 402). It may be determined that it is outside of the building 402 based off of any one or more aspects described herein (e.g., light sensor 212 of FIG. 2). As the user device 208 moves from the first position 412 along a vector 413 to a second position 414, inside at the ground level, the user device 208 determines based off of one or more sensors that the user device 208 has moved from an outdoor location to an indoor location according to any one or more aspects described herein. Based on said determination, the user device 208 may execute a pressure calibration process, wherein it determines that because it moved along the vector 413, that it is at the ground level, or first level 404, of the building 402. The movement from the first position 412 to the second position 414 is seen in chart 430 comparing pressure and time to the user device 208. While at the first position 412, the user device 208 has a first pressure 440. As it moves along the same height 442, equating to the vector 413, it observes a second pressure 444 indoors. The second pressure 444 is equivalent to the pressure observed at the second position 414. As the user device 208 moves up one floor for example, by stairs, along the vector 415 to the third position 416, the chart 430 indicates that the pressure incrementally increases along area 446 from the second pressure 444 to the higher third pressure 448. Based on that increase in pressure, the user device 208 may determine that it has gone up one floor, to the second floor 406 of the building 402. The user device 208 may then observe that it moves along generally the same height 450, equating to the vector 417 to a fourth position 418. The charted portion 450 showing that the third pressure 448 is equivalent to the pressure observed at the fourth position 452. If the user device 208 were to move, for example, in an elevator quickly from one floor to another along elevator 419 to a fifth position 420, the resulting pressure change in chart 430 may equate to the zone 454 noticing a rapid change from the fourth pressure reading 452 to the fifth pressure reading 456, which may be determined to be equivalent to two floors, allowing the user device 208 to determine that it is located on the fourth floor 410 in building 402, where it will remain as indicated by the fifth zone 458 where the pressure remains more or less constant.

Figure 5:
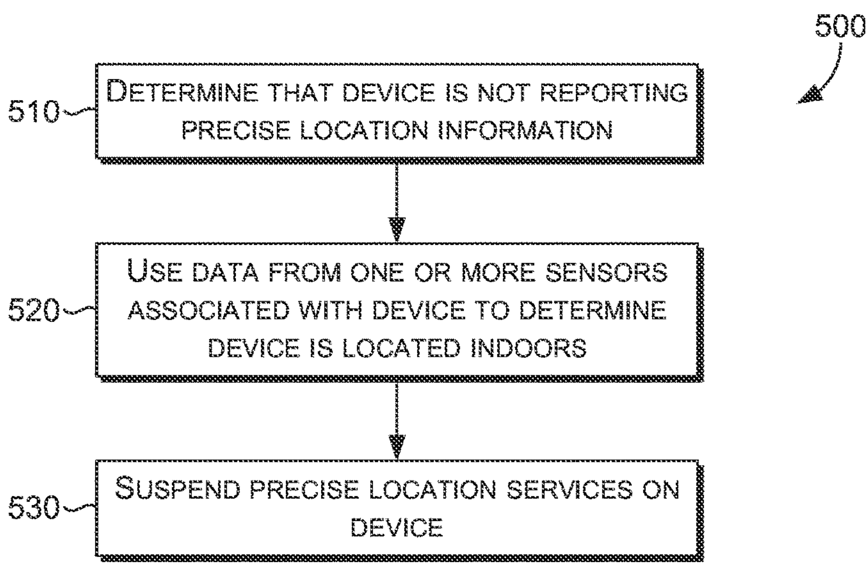
FIG. 5 depicts a flow diagram of an exemplary method for determining when to suspend precise location services on a user device, in accordance with implementations of the present disclosure.

Turning now to FIG. 5, a flowchart is provided of a method 500 for determining when to suspend precise location services on a device. Initially at block 510, it is determined that the device is not reporting precise location information. At block 520, data is used from one or more sensors associated with the device to determine that the device is located indoors. The sensors used may include a light sensor, accelerometer, magnetic sensor, and/or air pressure sensor. Finally, at block 530, based on the determination that the device is located indoors, precise location services are suspended on the device.

Figure 6:
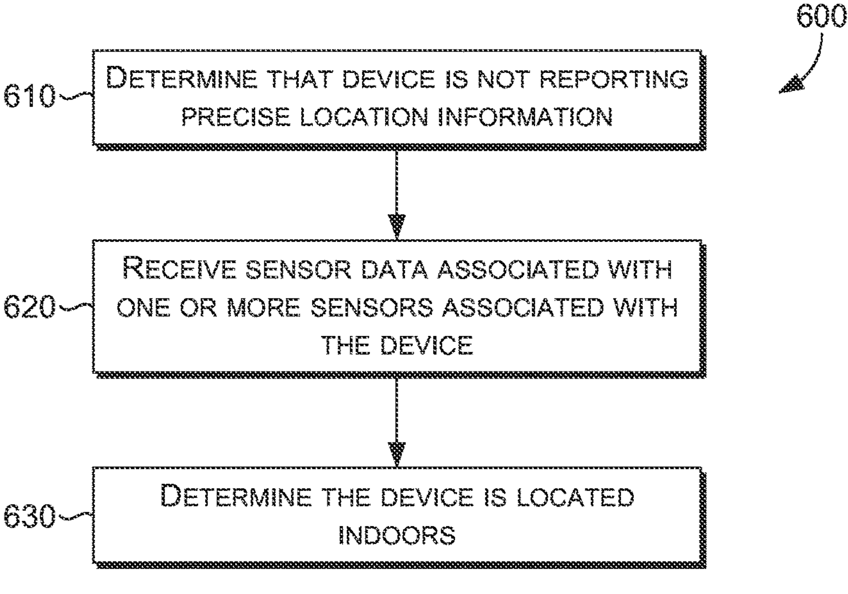
FIG. 6 depicts a flow diagram of an exemplary method for determining a user device is located indoors, in accordance with implementations of the present disclosure.

Turning now to FIG. 6, a flowchart is provided of a method 600 for determining if a device is located indoors. Initially at block 610, it is determined that the device is not reporting precise location information. At block 620, data is used from one or more sensors associated with the device to determine that the device is located indoors. The sensors used may include a light sensor, accelerometer, magnetic sensor, and/or air pressure sensor. Finally, at block 630, based on information gathered from the sensors, it can be determined that the device is indoors. In some aspects, cell sites can be deployed proximate to highly dense indoor areas to better serve the subscribers.

Figure 7:
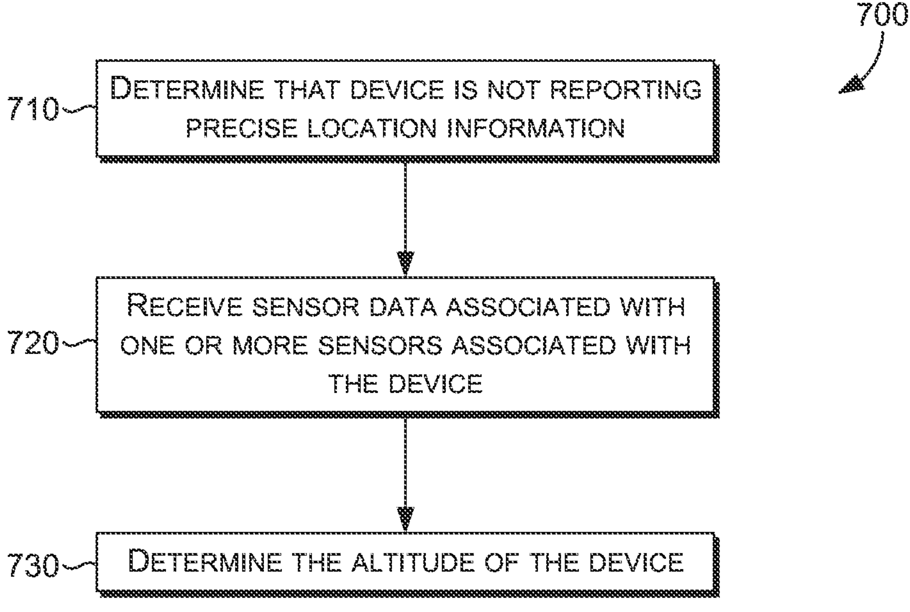
FIG. 7 depicts a flow diagram of an exemplary method for determining the altitude of a user device, in accordance with implementations of the present disclosure.

Turning now to FIG. 7, a flowchart is provided of a method 700 for determining the altitude of a device. Initially at block 710, it is determined that the device is not reporting precise location information. At block 720, data is used from one or more sensors associated with the device to determine that the device is located indoors. The sensors used may include a light sensor, accelerometer, magnetic sensor, and/or air pressure sensor. Finally, at block 730, based on information gathered from the sensors, the altitude of the device can be determined. In some aspects, cell site can undergo beam steering to reach subscribers on top floors of buildings. In other aspects, the altitude information can be provided to emergency responders to determine the exact location of someone in a tall building if needed.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for determining a location of a device, the method comprising:

determining that the device is not reporting precise location information;

based on output from one or more sensors determining that the device is located indoors; and instructing the device to suspend precise location services on the device, wherein the one or more sensors include a magnetic sensor that assesses an orientation of the device in comparison to a light source to determine if the light source is natural light or artificial light.

2. The method of claim 1, wherein the determining is based on an absence of a return signal to a wireless telecommunications network after an attempt by a GPS system to transmit a GPS signal to the device.

3. The method of claim 2, further comprising:

using sensor data to determine that the device is located outdoors; and instructing the device to reactivate the precise location information.

4. The method of claim 3, where the determination that the device is located outdoors is performed after a predetermined period of time after it has been determined that the device is located indoors.

5. The method of claim 1, further comprising displaying an indication to a mobile network operator with a recommendation to deploy a small cell within a structure associated with an indoor location of the device.

6. The method of claim 1, wherein the one or more sensors are associated with the device.

7. The method of claim 1, wherein the suspending the precise location services comprises instructing the device to deactivate one or more processes associated with determining a location of the device using one or more received GPS signals.

8. The method of claim 1, wherein, the one or more sensors include a light sensor.

9. The method of claim 8, wherein the light sensor uses a light frequency measurement to determine if a light source is artificial light or natural light.

10. The method of claim 1, wherein the one or more sensors include an accelerometer.

11. The method of claim 10, wherein it is determined that the device is located indoors when data from the accelerometer indicates that the device has not moved for a pre-determined period of time.

12. The method of claim 10, wherein it is determined that the device is located outdoors when data from the accelerometer indicates that the device is moving for a predetermined period of time.

13. A system for determining a location of a device, the system comprising:

one or more processors; and one or more non-transitory computer storage hardware devices storing computer-usable instructions that, when used by the one of more processors, cause the one or more processors to:

based on data from one or more sensors associated with the device, determine that the device is located indoors; and based on the device being located indoors, suspend, for a pre-determined period of time, precise location services on the device, wherein the one or more sensors comprise a magnetic sensor that comprises a compass that detects a direction of sunlight based on a time of day and compares the direction of sunlight to a light source to determine if the light source is natural light or artificial light.

14. The system of claim 13, wherein the data from the one or more sensors is the result of acceleration of the device.

15. The system of claim 13, wherein the one or more sensors comprise an optical sensor, and wherein the data from the optical sensor is used to determine that a light intensity is within a predetermined range over a predetermined amount of time.

16. The system of claim 15, wherein the light intensity indicates that the device is located indoors.

17. One or more non-transitory computer-readable media having computer-usable instructions embodied thereon that, when executed by one or more processors, cause the processors to:

based on data from one or more sensors associated with the device, determine that the device is located indoors;

based on the device being located indoors, suspend, for a pre-determined period of time, precise location services on the device; and display an indication to a mobile network operator with a recommendation to deploy a small cell within a structure associated with an indoor location of the device.

* * * * *